United States Patent Office 3,657,298
Patented Apr. 18, 1972

3,657,298
ARSENIC AND PHOSPHORUS CONTAINING POLYDENTATES
Robert Bruce King, Athens, Ga., and Pramesh N. Kapoor, Pittsburgh, Pa., assignors of fractional part interest to Pressure Chemical Co., Pittsburgh, Pa.
No Drawing. Filed Jan. 6, 1970, Ser. No. 1,058
Int. Cl. C07f 9/50, 9/74
U.S. Cl. 260—440
16 Claims

ABSTRACT OF THE DISCLOSURE

Polydentate compounds including (1) polytertiary phosphines, (2) polytertiary arsines, and (3) polytertiary arsino-phosphines, containing four or more trivalent phosphorus atoms, four or more trivalent arsenic atoms, and a combination of four or more trivalent phosphorus atoms and trivalent arsenic atoms, respectively, with a bridge of two carbon atoms, for example, —CH=CH— or —CH$_2$—CH$_2$—, between at least two of the phosphorus atoms, two of the arsenic atoms, and the phosphorus and arsenic atom, respectively, and (4) polytertiary arsinophosphines containing at least one trivalent phosphorus atom and at least one trivalent arsenic atom with a bridge of two carbon atoms, for example, —CH=CH— or —CH$_2$—CH$_2$—, bewteen the phosphorus and arsenic atoms, said compounds being useful as additives in gasolines and for forming complexes with metal carbonyls and metal halides for use as catalysts in the polymerization or oligomerization of olefins and acetylenes and in hydrogenation processes; and the base-catalyzed addition process of synthesizing the foregoing compounds wherein the addition of compounds with phosphorus-hydrogen bonds or arsenic-hydrogen bonds to vinyl or ethylnyl phosphorus or arsenic derivatives is brought about, each of the phosphorus and arsenic being in its trivalent state.

This invention relates to novel polydentate compounds including polytertiary phosphines, polytertiary arsines, and polytertiary arsino-phosphines, each containing four or more trivalent phosphorus atoms, four or more trivalent arsenic atoms, and a combination of four or more trivalent phosphorus atoms and trivalent arsenic atoms, respectively, with a bridge of two carbon atoms between at least two of the trivalent atoms. Also, this invention relates to such polydentate compounds as polytertiary arsino-phosphines having at least one trivalent phosphorus atom and at least one trivalent arsenic atom with a bridge of two carbon atoms between the phosphorus and arsenic atoms. In addition, this invention relates to a novel base-catalyzed addition process for making the foregoing compounds, and the process comprises the base-catalyzed addition of compounds with phosphorus-hydrogen bonds or arsenic-hydrogen bonds to vinyl or ethynyl trivalent phosphorus or trivalent arsenic derivatives. The foregoing compounds containing four or more of the trivalent atoms, as aforesaid, and containing at least one trivalent phosphorus atom and at least one trivalent arsenic atom, as aforesaid, are made by the aforesaid novel process. In addition, the aforesaid novel process is carried out to make known polydentates having less than four trivalent atoms, for example, two and three, wherein said atoms are the same, for example, arsenic or phosphorus, in much higher yields than known processes and of such a nature that they can be more readily purified than can those made by known processes. The novel polydentate compounds, as aforesaid, are useful in forming complexes with metal carbonyls and metal halides for use as catalysts in the polymerization of olefins and alkynes and in hydrogenation processes to give much higher yields and higher grade products. Also, the novel polydentate compounds are useful as gasoline additives. The novel polydentates have improved coordinating ability especially with regard to their abilities to occupy more coordination positions in forming complexes, for example, with metal carbonyl complexes such as used as catalysts in hydrogenation processes.

Heretofore, polydentate compounds such as polytertiary phosphines and polytertiary arsines have been formed by reacting an alkali metal diarylphosphide with a 1,2-dihaloethane, for example, an alkali metal diphenylphosphide with 1,2-dichloroethane, to obtain a ditertiary phosphine, for example, (C$_6$H$_5$)$_2$PCH$_2$CH$_2$P(C$_6$H$_5$)$_2$, in relatively small yields, for example, about 40%. Also, such compounds as the tritertiary phosphine

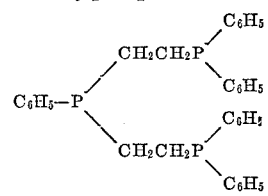

were made by reacting sodium diphenyl phosphide and the difficultly accessible phenyl bis(2-bromoethyl) phosphine C$_6$H$_5$P(CH$_2$CH$_2$Br)$_2$ in relatively small yields, for example, 15 to 16%. Heretofore, polytertiary phosphines, polytertiary arsines, and polytertiary arsino-phosphines, having four or more trivalent phosphorus atoms, four or more trivalent arsenic atoms, and a combination of four or more trivalent phosphorus atoms and trivalent arsenic atoms, respectively, except a hexadentate polytertiary arsine ligand [see Harris et al., Chem. Commun., 965 (1968)], with a bridge of two carbon atoms, for example, —CH=CH— or —CH$_2$—CH$_2$—, between at least two of the trivalent atoms, and polytertiary arsino-phosphines having at least one trivalent phosphorus atom and at least one trivalent arsenic atom with a bridge of two carbon atoms, for example, —CH=CH— or —CH$_2$—CH$_2$—, between the phosphorus and arsenic atoms, have not been known and available. With our novel base-catalyzed process of this invention we have made for the first time our novel compounds, as aforesaid, and also known compounds in yields higher, for example, 65–90% or greater, than ever before attained by prior art processes, for example, 15–40%, as aforesaid. Polytertiary phosphines and polytertiary arsines having no more than two trivalent phosphorus atoms and two trivalent arsenic atoms, respectively, with bridge of two carbon atoms between the two phosphorus atoms or the two arsenic atoms are disclosed in the Wald U.S. Pat. No. 3,130,237. Said Wald patent discloses a complex of cobalt and an organo-phosphine or an organo-arsine or a mixture of an organo-phosphine and an organo-arsine, but said Wald patent does not disclose a complex of cobalt and an organo arsino-phosphine.

The ditertiary phosphine 1,2 - bis(diphenylphosphino) ethane (C$_6$H$_5$)$_2$PCH$_2$CH$_2$P(C$_6$H$_5$)$_2$ is disclosed by Sasse in "Methoden der Organischen Chemie," Houben-Weyl, E. Muller, Ed., George Theme Verlag, Stuttgart, 1963, pp. 25–28. Hewertson et al. [J. Chem. Soc., 1490 (1962)] disclose the tritertiary phosphine

An object of this invention is to provide novel polydentate polytertiary phosphines, arsines and arsino-phosphines, having four or a combination of four of the respective trivalent atoms, except a hexadentate polytertiary arsine, with a two-carbon bridge between at least two of the trivalent atoms, and polytertiary arsino-phosphines having at least one trivalent phosphorus atom and at least one trivalent arsenic atom with a two-carbon bridge therebetween, said novel compounds having greatly improved coordinating ability especially with regard to the ability to occupy more coordination positions than heretofore known polydentate polytertiary arsine compounds and polytertiary phosphine compounds.

Another object of this invention is to provide the novel base-catalyzed addition process for making heretofore known polydentate polytertiary arsine compounds and polytertiary phosphine compounds in greater yields and in a more easily purifiable state than by heretofore known processes and for making the novel compounds, as aforesaid, wherein the addition of compounds with trivalent prosphorus-hydrogen bonds or trivalent arsenic-hydrogen bonds to vinyl or ethynyl trivalent phosphorus or trivalent arsenic derivatives is brought about.

Other objects and features will be readily apparent from the following detailed description which is not limiting but only illustrative of the preferred embodiments of this invention.

This application is directed to those skilled in the art to which it pertains, or with which it is most nearly connected, and sets forth the best mode and modes contemplated by us of carrying out our invention. The heretofore known organic chemistry, for example, that relating to alkyl groups, aromatic hydrocarbon groups, alkoxy groups, dialkylamino groups, alkoxy substituted alkyl and aromatic hydrocarbon groups, and dialkylamino substituted alkyl and aromatic hydrocarbon groups is widely known, that is, the nature of said groups as to the number of carbon atoms, hydrogen atoms, oxygen atoms, nitrogen atoms, etc., and it is not considered necessary to repeat same herein for the reason that those skilled in the art are aware of same without a detailed recitation of such conventional and generally widely known elements or groups of elements.

More particularly, the polydentate compounds of this invention have the general formulae (1)   $X(AYR^1R^2)_3$ (2)   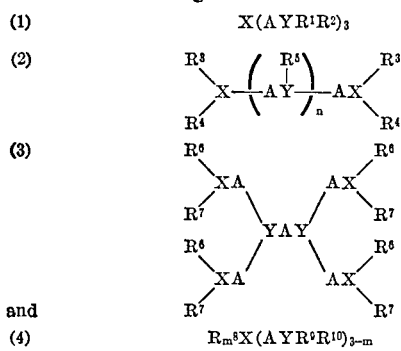

(3)

and (4)   $R_m{}^5X(AYR^9R^{10})_{3-m}$ 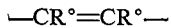

In the foregoing compounds, X is a trivalent phosphorus atom or a trivalent arsenic atom and A is either $$-CR°{=}CR°-$$

or $-CR_2°{-}CR_2°-$. R° is hydrogen, an alkyl group, an aromatic hydrogen group, an alkoxy substituted alkyl group, an alkoxy substituted aromatic hydrocarbon group, a dialkylamino substituted alkyl group, or a dialkylamino substituted aromatic hydrocarbon group, but at least one R° is hydrogen; $n$ is a whole number of at least 2; and $m$ is 1 or 2. Each of $R^1$, $R^2$, $R^3$, $R^4$, $R^5$, $R^6$, $R^7$, $R^8$, $R^9$ and $R^{10}$ is an alkyl group, an aromatic hydrocarbon group, an alkoxy substituted alkyl group, an alkoxy substituted aromatic hydrocarbon group, a dialkylamino substituted alkyl group, or a dialkylamino substituted aromatic hydrocarbon group.

As to the polydentate compound (1), supra, X and Y are both the trivalent phosphorus atom or the trivalent arsenic atom, or X is the trivalent phosphorus atom and Y is the trivalent arsenic atom, or X is the trivalent arsenic atom and Y is the trivalent phosphorus atom. With respect to the polydentate compound (2), supra, X is always the same, that is, X is either the trivalent phosphorus atom or the trivalent arsenic atom, and Y is either the trivalent phosphorus atom or the trivalent arsenic atom. As to the polydentate compound (3), supra, X is always the same, that is, X is either the trivalent phosphorus atom or the trivalent arsenic atom, and Y is either the trivalent phosphorus atom or the trivalent arsenic atom, but the X and Y members are never all trivalent arsenic atoms. For example, specific embodiments of the polydentate compound (3), supra, are those having the formulae

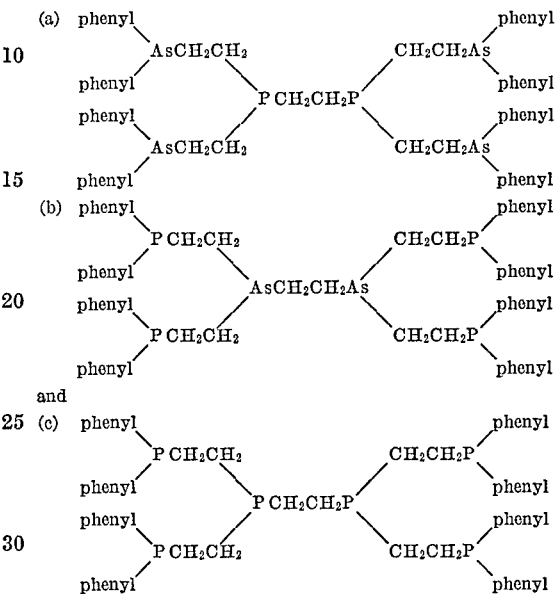

To make compound (a), supra, diphenylvinylarsine and 1,2-diphosphinoethane are reacted in accordance with the procedure described in Example 5, infra. To make compound (b), supra, diphenylvinylphosphine and 1,2-diarsinoethane are reacted in accordance with the procedure described in Example 5, infra. To make compound (c), supra, diphenylvinylphosphine and 1,2-diphosphinoethane are reacted in accordance with the procedure described in Example 5, infra.

With respect to polydentate compound (4), supra, X is either the trivalent phosphorus atom or the trivalent arsenic atom, and Y is either the trivalent arsenic atom or the trivalent phosphorus atom, but X and Y are not the same. For example, if X is the trivalent phosphorus atom, Y is the trivalent arsenic atom, and if X is the trivalent arsenic atom, Y is the trivalent phosphorus atom.

The number of carbon atoms in the aforestated alkyl groups ($R°$, $R^1$, $R^2$, $R^3$, $R^4$, $R^5$, $R^6$, $R^7$, $R^8$, $R^9$, and $R^{10}$) can be from one through seventy, for example, methyl, ethyl, propyl, isopropyl, n-butyl, sec-butyl, isobutyl, tert-butyl, n-pentyl or n-amyl, isopentyl or isoamyl, tert-amyl, neopentyl, hexyl and isomers thereof, heptyl and isomers thereof, octyl and isomers thereof, nonyl and isomers thereof, decyl and isomers thereof, undecyl and isomers thereof, dodecyl and isomers thereof, through heptacontyl and isomers thereof, and preferably from one through twelve carbon atoms, for example, methyl, ethyl, propyl and its isomers, n-butyl and its isomers, n-pentyl or n-amyl and its isomers, n-hexyl and its isomers, n-heptyl and its isomers, n-octyl and its isomers, n-nonyl and its isomers, n-decyl and its isomers, n-undecyl and its isomers and n-dodecyl and its isomers.

The number of carbon atoms in the aforestated aromatic hydrocarbon groups ($R°$, $R^1$, $R^2$, $R^3$, $R^4$, $R^5$, $R^6$, $R^7$, $R^8$, $R^9$ and $R^{10}$) can be up to twenty-four (24), for example, phenyl, phenoxy, α-naphthyl, β-naphthyl, dinaphthyl (from perylene or ααα′α′-dinaphthylene or βββ′β′-dinaphthylene), α-anthracyl or β-anthracyl or γ-anthracyl, α-phenanthryl or β-phenanthryl or γ-phenanthryl or δ-phenanthryl or ε-phenanthryl, benzo[def]phenanthryl (from pyrene), and such alkyl substituted aromatic hydrocarbon groups including the aforementioned alkyl groups as substituent groups, for example, benzyl and p-tolyl, etc., and preferably phenyl, benzyl and p-tolyl.

With respect to the alkoxy substituted alkyl groups and the aromatic hydrocarbon groups for $R^\circ$, $R^1$, $R^2$, $R^3$, $R^4$, $R^5$, $R^6$, $R^7$, $R^8$, $R^9$ and $R^{10}$ supra, the number of carbon atoms in the alkoxy substituent can be from one through seventy, as set forth in the alkyl groups, supra, for example, methoxy, ethoxy, etc., and preferably methoxy and ethoxy. As to the dialkylamino substituted alkyl groups and aromatic hydrocarbon groups for $R^\circ$, $R^1$, etc., the number of carbon atoms in the alkyl of the dialkylamino substituent can be from one through seventy, as for the alkyl groups, supra, for example, dimethyl, diethyl, etc., for example, dimethylamino, diethylamino, etc.

The novel process for preparing the novel polydentate compounds of this invention and other polydentate polytertiary phosphine and arsine compounds involves reacting (1) a phosphine or an arsine having at least one trivalent phosphorus-hydrogen bond or one trivalent arsenic-hydrogen bond, respectively, with (2) a phosphine having at least one vinyl-trivalent phosphorus bond or an arsine having at least one vinyl-trivalent arsenic bond or a phosphine having at least one ethynyl-trivalent phosphorus bond or an arsine having at least one ethynyl-trivalent arsenic bond in contact with a base catalyst. However, each of the reactant compounds contemplated under (1), supra, is free of a vinyl-trivalent phosphorus bond and a vinyl-trivalent arsenic bond and an ethynyl-trivalent phosphorus bond and an ethylnyl-trivalent arsenic bond and each of the reactant compounds under (2), supra, is free of a trivalent phosphorus-hydrogen bond and a trivalent arsenic-hydrogen bond. Also, each of the reactant compounds contemplated under (1), supra, has only one trivalent phosphorus-hydrogen bond or trivalent arsenic-hydrogen bond if the reactant compound under (2), supra, has a plurality, that is, more than one, of vinyl-trivalent phosphorus bonds, vinyl-trivalent arsenic bonds, ethylnyl-trivalent phosphorus bonds or ethynyl-trivalent arsenic bonds. In addition, each of the reactant compounds under (2), supra, has only one vinyl-trivalent phosphorus bond, one vinyl-trivalent arsenic bond, one ethynyl-trivalent phosphorus bond or one ethynyl-trivalent arsenic bond if the reactant compound under (1), supra, has a plurality, that is, more than one, of trivalent phosphorus-hydrogen bonds or trivalent arsenic-hydrogen bonds.

For example, in accordance with our novel process, in making known polytertiary phosphines and known polytertiary arsines having the formula $$R_m^8 X(AYR^9R^{10})_{3-m}$$

where X and Y are both phosphorus or both arsenic, the reactant compounds are, for example,

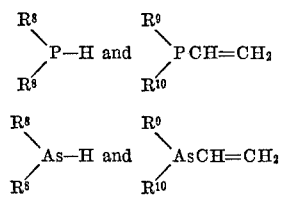

and $R^8$, $R^8$, $R^9$, and $R^{10}$ can be the same or different within the scope hereinbefore described. Likewise, in another embodiment, instead of the vinyl-phosphorus or the vinyl-arsenic bond-containing compounds, the ethynyl-phosphorus or the ethynyl-arsenic compounds.

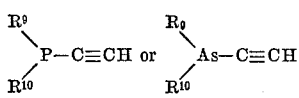

can be used. The reactions involving the foregoing compounds form the product compounds, with $m$ being the whole number 2, as follows

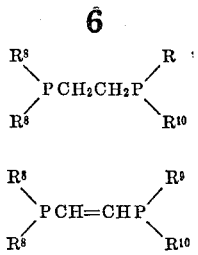

or

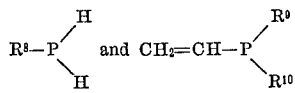

With $m$ being the whole number one, the reactant compounds

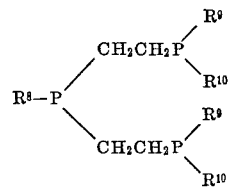

are reacted to form the product

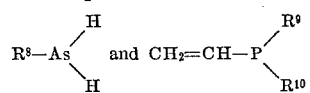

and the reactant compounds

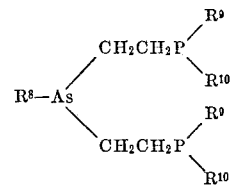

are reacted to form the product

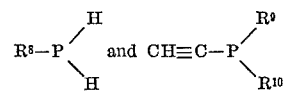

and the reactant compounds

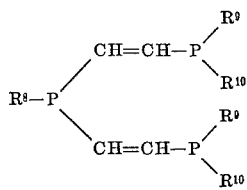

are reacted to form

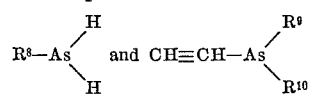

and the reactant compounds

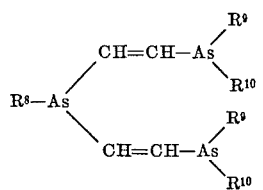

are reacted to form

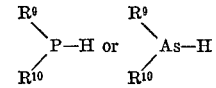

Also, in still another embodiment, with $m$ being the whole number one, reactant compounds are reacted with reactant compounds

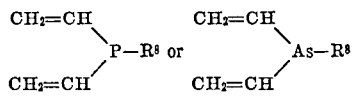

respectively, to form

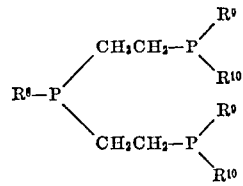

or

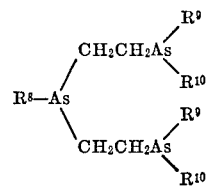

respectively. With $m$ being the whole number one, reactant compounds

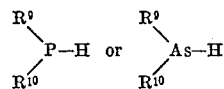

are reacted with reactant compounds

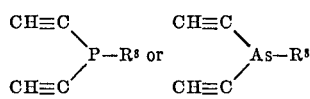

respectively, to form

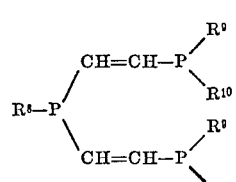

or

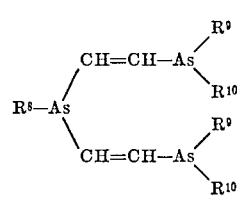

respectively.

Our novel compounds having four or more trivalent phosphorus atoms, four or more trivalent arsenic atoms, or a combination of four or more trivalent phosphorus atoms and trivalent arsenic atoms are formed, for example, by reacting reactant compounds having three vinyl-phosphorus or three ethynyl-phosphorus bonds or three vinyl-arsenic bonds or three ethynyl-arsenic bonds with a reactant compound having a phosphorus-hydrogen or an arsenic-hydrogen bond. For example,

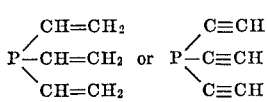

is reacted with

to form

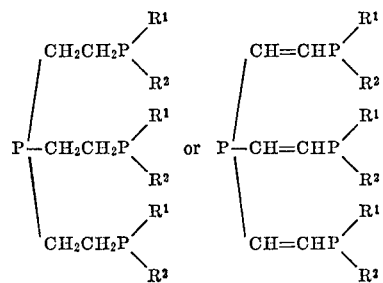

respectively. Also

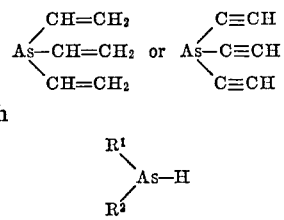

is reacted with

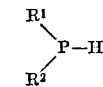

to form

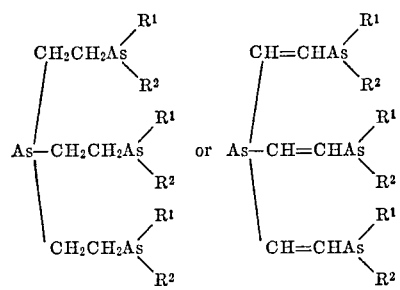

respectively. Also

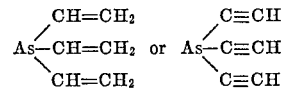

is reacted with

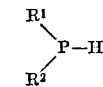

to form

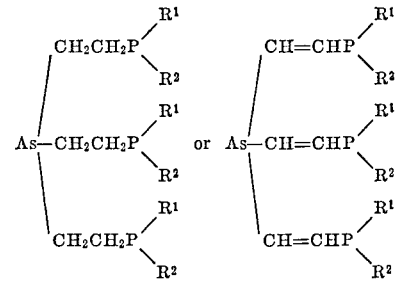

respectively. Also,

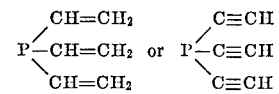

is reacted with

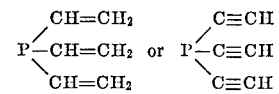

to form

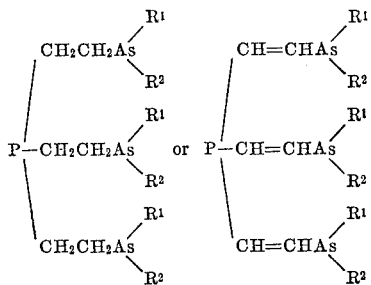

respectively. R¹ and R² can be the same or different. Further, as to our novel process for making our novel compounds,

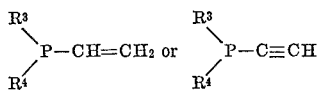

is reacted with

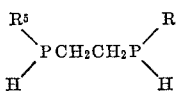

to form

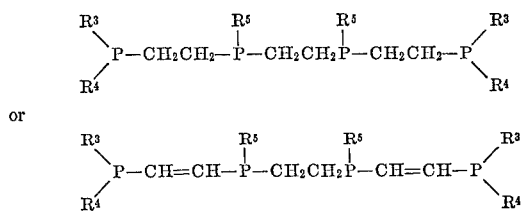

respectively. Also,

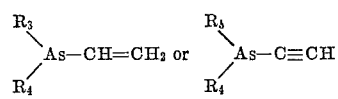

is reacted with

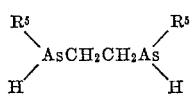

to form

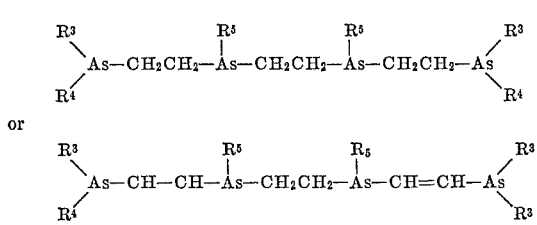

respectively. In addition,

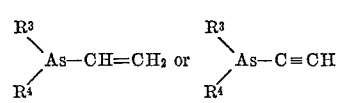

is reacted with

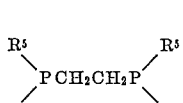

to form

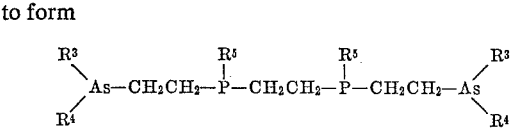

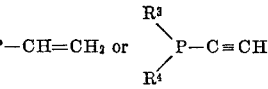

respectively. Also,

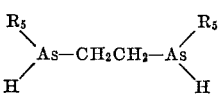

is reacted with

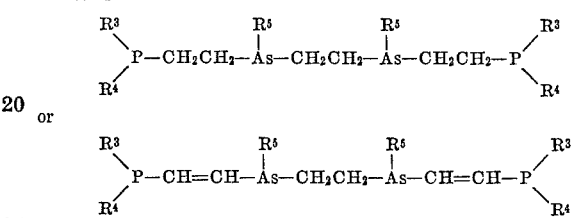

to form

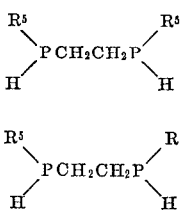

or

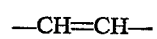

respectively. In the foregoing described novel compounds formed R³, R⁴ and R⁵ can be the same or different. Also, each substituent R⁵ can be the same or different. Also, the two-carbon atom bridge in each of the foregoing recited reactant comopunds

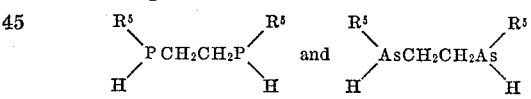

can be replaced by the two-carbon atom bridge

—CH=CH—

The compounds

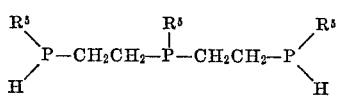

are formed by cleavage of $(R^5)_2PCH_2CH_2P(R^5)_2$ and $(R^5)_2AsCH_2CH_2As(R^5)_2$, respectively, with sodium metal in liquid ammonia or by the method of Issleib et al., Ber., 101, 2197 (1968), where $R^5$ is $C_6H_5$—. With respect to $n$ in Formula 2, supra, $n$ is a whole number of at least 2, and can be 2, 3, etc. and is preferably 2 or 3. Where $n$ is 3 the phosphorous-hydrogen bond and arsenic-hydrogen bond containing compounds are

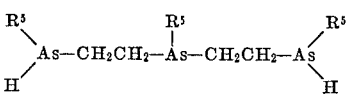

and

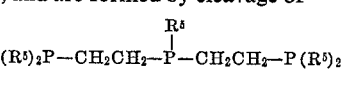

respectively, and are formed by cleavage of $(R^5)_2P$—$CH_2CH_2$—$P$—$CH_2CH_2$—$P(R^5)_2$ and $(R^5)_2As$—$CH_2CH_2$—$As$—$CH_2CH_2$—$As(R^5)_2$ respectively, with sodium metal in liquid ammonia, supra.

Also, our novel process is also used in making our novel compounds having the general formula

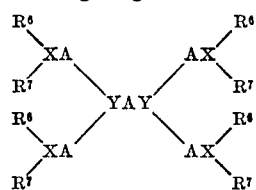

(3), supra.

For example,

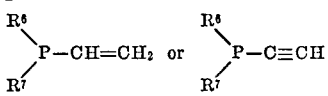

is reacted with

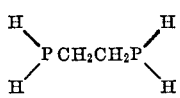

to form

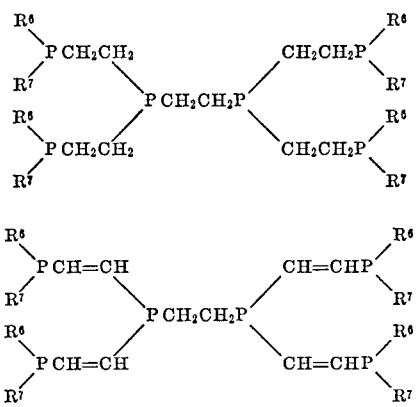

respectively. Also,

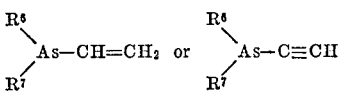

is reacted with

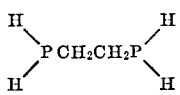

to form

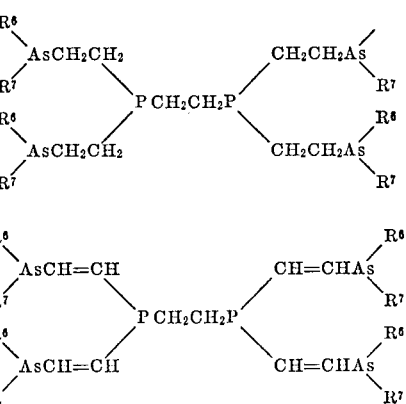

respectively. In addition,

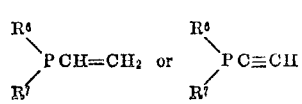

is reacted with

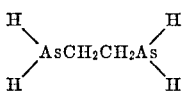

to form

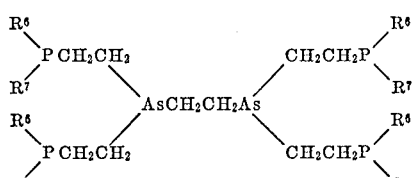

or

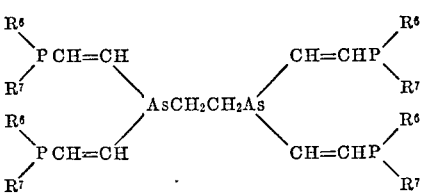

respectively. In the foregoing described novel compounds formed $R^6$ and $R^7$ can be the same or different.

In carrying out the foregoing processes a base catalyst is utilized, and, depending upon the particular combination of reactants and catalyst, our novel processes can be carried out at temperatures ranging from about −80° C. through about 350° C., and the preferred temperatures are in the range from about 80° C. through 100° C. Pressures both active and below tmospheric pressure as well at atmospheric pressure are used in carrying out our novel processes, and atmospheric pressure is preferred. In situations wherein one or more of the reactants or the catalyst, or both, boils below the reaction temperature, pressures above atmospheric pressure are necessary, and sealed pressure vessels are used. Also in instances where a reactant is gaseous, for example, $PH_3$, the reaction can be carried out by generating the reactant and passing it through a solvent such as tetrahydrofuran containing the other reactant and the catalyst. The weight proportions in which the reactant compounds are used to form the novel compounds of this invention can be varied within wide limits of their respective molar proportions, that is, 19:1 to 1:19, but the use of stoichiometric quantities of the reactant compounds enable the attainment of readily purifiable high yields of known polydentate polytertiary arsine and polytetriary phosphine compounds, for example, from 65 through 90% yields and readily purifiable yields of our novel compounds in substantially high yields. Also contemplated within the scope of our invention are our novel processes using substantially stoichiometric quantities of reactant compounds to form the substantially readily purifiable yields of our novel compounds of this invention. In making both the known polydentate compounds and the novel polydentate compounds of this invention, the use of substantially stoichiometric amounts of the reactant compounds enables the attainment of easily and readily purifiable product compounds and highly purified product compounds, respectively. In those instances where at least one of the reactants and some of the catalystes oxidize rapidly when exposed to air, our novel process is carried out in an inert atmosphere, and preferably nitrogen because of its low cost, but other inert gaseous atmospheres such as an argon or a helium atmosphere can be used. Also, our novel process can be carried out in a vacuum. The basic catalysts are used in amounts varying within wide limits and preferably in relatively small amounts with respect to the total weight of the reactants, for example, 0.01%–20%, and preferably 1–10%, by weight of the total weight of the reactants.

The base catalysts used in carrying out the novel processes of our invention are alkyllithium compounds wherein the alkyl group has 1 through 70 carbon atoms, and preferably 1 through 12 carbon atoms, aryllithiums wherein the aryl group has 1 through 12 carbon atoms, and preferably phenyllithium, alkoxides of alkali metals, alkoxides of alkaline earth metals and alkoxides of lanthanide elements, for example, sodium tert-butoxide and potassium tert-butoxide, and preferably potassium tert-butoxide, dialkylamido derivatives of alkali metals, dialkylamido derivatives of alkaline earth metals and dialkylamido derivatives of lanthanide elements, for example, lithium dimethylamide having the formula

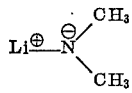

arylamido derivatives of alkali metals, arylamido derivatives of alkaline earth metals and arylamido derivatives of lanthanide elements, arylalkylamido derivatives of alkali metals, arylalkylamido derivatives of alkaline earth metals and arylalkylamido derivatives of lanthanide elements, for example, the sodium derivative of N-methylaniline having the formula

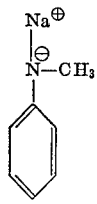

diarylamido derivatives of alkali metals, diarylamido derivatives of alkaline earth metals and diarylamido derivatives of lanthanide elements, strongly basic amines, for example, pentamethylguanidine, and mixtures of one or more of the foregoing base catalysts.

Also, in carrying out our novel processes, an inert diluent, in which the reactant compounds and the catalyst are stable and in which the reactants have some solubility, can be used. Among the diluents are hydrocarbons, such as hexane, heptane, benzene, toluene, xylene, mesitylene, Tetralin, etc., and ethers, alcohols, etc. However, an inert diluent is not essential.

The following examples illustrate details of procedures which may be followed. However, the following examples are given only for the purpose of illustration and are not to be construed as limiting our invention in any way.

EXAMPLE 1

A mixture of two (2) grams (.0167 mole) of trivinylphosphine and ten (10) grams (.0538 mole) of diphenylphosphine, 10 grams of a 1 molar solution of phenyllithium in 70:30 benzene-ether, and 100 grams of dry benzene was boiled under reflux in a nitrogen atmosphere for 20 hours. The reaction mixture was cooled to room temperature, and the solvent was removed in a water aspirator vacuum. The residue was washed with methanol and then was recrystallized from a mixture of methanol and benzene, and the yield was 7 grams (.0105 mole) of tris (2-diphenylphosphinoethyl) phosphine having the formula

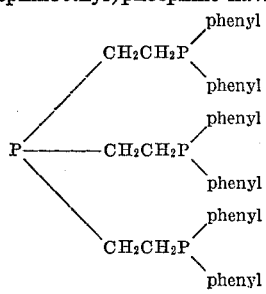

An excess of diphenylphosphine was used. The yield obtained was approximately 63%. The compound can be used as a tetradentate ligand in forming metal complexes. The compound has a melting point of 131° C.

Analysis.—Calculated for $C_{42}H_{42}P_4$ (percent): C, 75.3; H, 6.3; P, 18.4 (mol. wt. 670). Found (percent): C, 75.1; H, 6.5; P, 17.9 (mol. wt. 667).

EXAMPLE 2

A mixture of two grams (.0167 mole) of trivinylphosphine, ten (10) grams (.0538 mole) of diphenylphosphine, one (1) gram of potassium tert-butoxide, and 100 grams of dry benzene was boiled under reflux in a nitrogen atmosphere for 12 hours. The product was isolated in the same manner as in Example 1 to yield 7 grams (.0105 mole) of tris(2-diphenylphosphinoethyl) phosphine having a melting point of 128–129° C. and was shown by its infrared spectrum to be identical to the compound prepared in Example 1. The yield was approximately 63%.

EXAMPLE 3

A stainless steel pressure vessel was charged with 100 grams of dry benzene, 10 grams of a 1 molar solution of phenyllithium in 70:30 benzene-ether, and 30 grams (.142 mole) of diphenylvinylphosphine. After cooling in a liquid nitrogen bath the vessel was charged with about 3 grams (.09 mole) of phosphine ($PH_3$). The vessel was heated in an oven at 100° C. for 36 hours. The vessel was then cooled and the solvent was removed in a water aspirator vacuum. Vacuum distillation of the resulting brown oil resulted in the recovery of 20 grams (.095 mole) of the diphenylvinylphosphine. Ten grams (.047 mole) of diphenylvinylphosphine were used in the reaction (.142−.095=.047 mole). The distillation residue was recrystallized from a mixture of benzene and methanol to give 2.5 grams (.004 mole) of white crystalline tris(2-diphenylphosphinoethyl) phosphine having a melting point of 129–130° C. The infrared spectrum of this product was identical to the compound prepared in Example 1. To obtain a 100% theoretical yield of product using the molar ratio of 3:1 for diphenylvinylphosphine to phosphine, respectively, the molar ratio of the product to the diphenylvinylphosphine would be 1:3 and the molar ratio of the product to the phosphine would be 1:1. An excess of phosphine gas was used, and the yield, based upon the reaction of .047 mole of diphenylvinylphosphine and .016 mole of phosphine gas, was approximately 25%.

EXAMPLE 4

A mixture of 4 grams (.0163 mole) of 1,2-bis(phenylphosphino) ethane having the formula $$C_6H_5—P(H)CH_2CH_2P(H)—C_6H_5$$

7 grams (.033 mole) of diphenylvinylphosphine, 0.6 gram of potassium tert-butoxide, and 100 grams of dry benzene was boiled under reflux in a nitrogen atmosphere for 24 hours. The reaction mixture was cooled to room temperature and the solvent was removed in a water aspirator vacuum. The residue was washed with methanol and then was recrystallized twice from mixtures of benzene and methanol to give 5.6 grams (.0084 mole) of 1,1,4,7,10,10-hexaphenyl - 1,4,7,10 - tetraphosphadecane having the formula

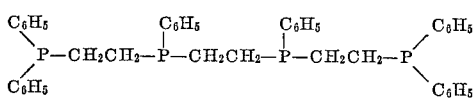

having a melting point of 155–158° C. The yield obtained was approximately 51.5%. This compound can be used as a tetradentate ligand in forming metal compounds.

Analysis.—Calculated for $C_{42}H_{42}P_4$ (percent): C, 75.3; H, 6.3; P, 18.4 (molecular weight 670). Found (percent): C, 74.3; H, 6.3; P, 17.9 (molecular weight 670).

EXAMPLE 5

A mixture of 21 grams (.099 mole) of diphenylvinylphosphine, 2 grams (.022 mole) of 1,2-diphosphinoethane, 15 grams of 1 molar phenyllithium in 70:30 benzene-ether, and 150 grams of dry benzene was boiled under reflux in a nitrogen atmosphere for 24 hours. The reaction mixture was cooled to room temperature, and the solvent was then removed in a water aspirator vacuum. Unreacted diphenylvinylphosphine in the amount of 16 grams (.075 mole) was removed from the resulting liquid by distillation at 121° C./0.5 mm., as in Example 3, supra, and the residue was recrystallized from a mixture of benzene and methanol. The yield of the product compound 1,1,4,4 - tetrakis(2 - diphenylphosphinoethyl) - 1,4 - diphosphabutane having the formula

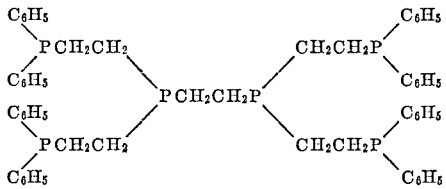

was 1.2 grams (.0013 mole) having a melting point of 138–140° C. This product compound can be used as a hexadentate ligand in forming metal complexes.

Analysis.—Calculated for $C_{58}H_{60}P_6$ (percent): C, 73.9; H, 6.4; P, 19.7 (molecular weight 952). Found (percent): C, 71.9; H, 6.4; P, 20.9 (molecular weight 950).

A yield of about 21.3% of product compound was obtained.

EXAMPLE 6

A mixture of 5 grams (.024 mole) of diphenylvinylphosphine, 5.4 grams (0.23 mole) of diphenylarsine, 0.5 gram of potassium tert-butoxide, and 100 grams of dry benzene was boiled under reflux in a nitrogen atmosphere for 24 hours. The reaction mixture was cooled to room temperature and solvent was then removed in a water aspirator vacuum. After washing with methanol the residue was recrystallized from a mixture of methanol and benzene, and 8 grams (.019 mole) of white crystalline 1-diphenylphosphino-2 - diphenylarsinoethane having the formula

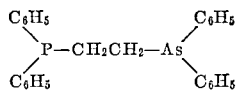

was obtained. This product can be used as a bidentate ligand in forming metal complexes. The yield was about 82.5%.

Analysis.—Calculated for $C_{26}H_{24}AsP$ (percent): C, 70.6; H, 5.5; As, 16.9; P, 7.0 (molecular weight 442). Found (percent): C, 69.8; H, 5.5; As, 17.5; P, 7.0 (molecular weight 441).

EXAMPLE 7

A mixture of 2 grams (.0095 mole) of diphenylethynylphosphine, 2.2 grams (.0095 mole) of diphenylarsine, 0.3 gram of potassium tert-butoxide, and 100 grams of dry benzene was boiled under reflux in a nitrogen atmosphere for 24 hours. After cooling to room temperature the solvent was removed from the reaction mixture in a water aspirator vacuum. After washing with methanol, the residue was crystallized from a mixture of benzene and methanol to yield 3.5 grams (.0080 mole) of trans-1-diphenyl-phosphino-2-diphenylarsinoethylene having the formula

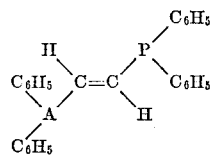

having a melting point of 95–96° C. The yield was approximately 84.5%. The proton n.m.r. spectrum of the product compound exhibited a strong somewhat broad phenyl resonance at τ2.7–2.8 and two relatively weak doublet vinyl resonances at τ3.07 (J=14.5 c.p.s.) and τ3.10 (J=16 c.p.s.). The greater similarity of this spectrum to the reported spectrum in Aguiar et al., J. Am. Chem. Soc., 86, 2299 (1964) of

than that of the corresponding cis-isomer indicates this product to be

rather than the corresponding cis-isomer. This product compound can be used as a bidentate ligand in forming metal complexes.

Analysis.—Calculated for $C_{26}H_{22}AsP$ (percent): C, 70.9; H, 5.0; As, 17.1; P, 7.0 (molecular weight 440). Found (percent): C, 70.8; H, 5.0; As, 16.9; P, 7.1; (molecular weight 441).

EXAMPLE 8

A mixture of 2 grams (.0123 mole) of phenyldivinylphosphine, 5.8 grams (.0252 mole) of diphenylarsine, 0.5 gram of potassium tert-butoxide, and 100 grams of dry benzene was boiled under reflux in a nitrogen atmosphere for 20 hours. After cooling to room temperature the solvent was removed in a water pump vacuum. The residue was washed with methanol and then recrystallized from a mixture of benzene and methanol to yield 3.6 grams (.0058 mole) of bis(2-diphenylarsinoethyl) phenylphosphine having the formula

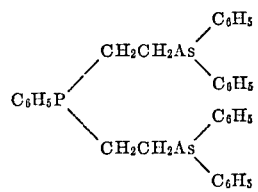

having a melting point of 160–162° C. The yield was approximately 47.2%. This product compound can be used as a tridentate ligand in forming metal complexes.

Analysis.—Calculated for $C_{34}H_{33}As_2P$ (percent): C, 65.5; H, 5.3; P, 5.0 (molecular weight 622). Found (percent): C, 64.3; H, 5.1; P, 5.2 (molecular weight 623).

EXAMPLE 9

A mixture of 5 grams (.023 mole) of diphenylvinylphosphine, 4.3 grams (.023 mole) of diphenylphosphine, 4 grams of a 1 molar solution of phenyllithium in 70:30 benzene-ether, and 100 grams of benzene was boiled under reflux for 20 hours. After cooling to room temperature the solvent was removed in a water pump vacuum. The residue was washed with methanol and then recrystallized from a mixture of methanol and benzene to yield 7.5 grams (.019 mole) of 1,2-bis(diphenylphosphino)-ethane having the formula

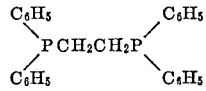

having the melting point of 139–140° C. The yield was approximately 83%. This product compound can be used as a bidentate ligand in forming metal complexes. The infrared spectrum of this product compound was identical to that of the 1,2-bis(diphenylphosphino)-ethane prepared from lithium diphenylphosphide and 1,2-dichlorethane [see Hewertson et al., J. Chem. Soc., 1490 (1962)].

EXAMPLE 10

A mixture of 3 grams (.0143 mole) [ a slight excess was used] of diphenylethynylphosphine, 2.6 grams (.0140 mole) of diphenylphosphine, 2 grams of 1 molar solution of phenyllithium in 70:30 benzene-ether and 100 grams of benzene was boiled under reflux for 14 hours. After cooling to room temperature the solvent was removed from the reaction mixture in a water aspirator vacuum.

The residue was then washed with methanol and recrystallized from a mixture of methanol and benzene to yield 3.7 grams (.0093 mole) of white crystalline trans-$(C_6H_5)_2PCH=CHP(C_6H_5)_2$ having the melting point 123-124° C. The yield of the product compound was approximately 66.3%, the structural formula of said compound being

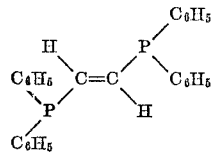

The infrared and proton n.m.r. spectra of the product compound and the infrared and proton n.m.r. spectra of the trans-$(C_6H_5)_2PCH=CHP(C_6H_5)_2$ prepared from trans-1,2-dichloroethylene lithium diphenylphosphide [see Aguiar et al., J. Am. Chem. Soc., 86, 2299 (1964)] and were identical. This product compound can be used as a bidentate ligand in forming metal complexes.

EXAMPLE 11

A mixture of 3 grams (.0185 mole) of phenyldivinylphosphine, 7 grams (.0373 mole) of dipheynlphosphine, 7 grams of a 1 molar solution of phenyllithium in 70:30 benzene-ether and 50 grams of dry benzene was boiled under reflux in a nitrogen atmosphere for 24 hours. After cooling to room temperature the solvent was removed in a water pump vacuum. The residue was washed with methanol and recrystallized from a mixture of methanol and benzene to yield 7.5 grams (.0140 mole) of bis(2-diphenylphosphinoethyl)-phenylphosphine having the formula

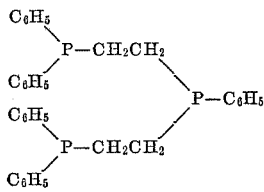

having a melting point of 129-130° C. The yield was approximately 76%. This product compound can be used as a tridentate ligand in forming metal complexes.

*Analysis.*—Calculated for $C_{34}H_{33}P_3$ (percent): C, 76.5; H, 6.2; P, 17.3 (molecular weight 534). Found (percent): C, 76.2; H, 6.2; P, 17.2 (molecular weight 534 (mass spec.)).

EXAMPLE 12

A mixture of 20 grams (.094 mole) of diphenylvinylphosphine, 5.2 grams (.047 mole) of phenylphosphine, 5 grams of a 1 molar solution of phenyllithium in 70:30 benzene-ether and 150 grams of dry benzene was boiled under reflux in a nitrogen atmosphere for 24 hours. After cooling to room temperature the solvent was removed in a water pump vacuum. The residue was washed with methanol and then recrystallized from a mixture of methanol and benzene to yield 18 grams (.034 mole) of bis(2-diphenylphosphinoethyl) phenylphosphine having the formula

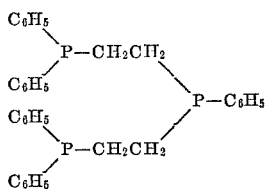

having the melting point of 128-129° C. The yield was approximately 71.3%. The infrared spectrum of this product compound was identical to the product compound of Example 11, supra. This product compound can be used as a tridentate ligand in forming metal complexes.

EXAMPLE 13

A mixture of 10 grams (.047 mole) of diphenylvinylphosphine, 2.6 grams (.0235 mole) of phenylphosphine, 0.5 grams of potassium tert-butoxide, and 100 grams of dry benzene was boiled under reflux in a nitrogen atmosphere for 24 hours. After cooling to room temperature the solvent was removed in a water aspirator vacuum. The residue was washed with methanol and recrystallized from a mixture of methanol and benzene to yield 11 grams (.0206 mole) of white crystalline bis(2-diphenylphosphinoethyl) phenylphosphine having the formula

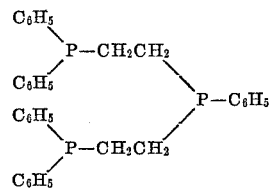

having the melting point of 127° C. The yield was approximately 87.5%. The infrared spectrum of this product compound was identical to the product compound of Example 11, supra. Also, the product compound herein can be used as a tridentate ligand in forming metal complexes.

EXAMPLE 14

A mixture of 10 grams (.047 mole) of diphenylvinylphosphine and 0.6 gram of potassium tert-butoxide was added to 150 grams of tetrahydrofuran and the mixture was boiled under reflux. Then 3 grams (.09 mole) of phosphine gas, generated from aluminum phosphide in dioxane and water was bubbled through the boiling under reflux mixture in tetrahydrofuran for 3 hours. The mixture was then cooled and the tetrahydrofuran was recovered by pumping it off under vacuum. The residue was washed with methanol and recrystallized from a mixture of methanol and benzene to yield 9.5 grams (.0142 mole) of white crystalline tris(2-diphenylphosphinoethyl) phosphine having the formula

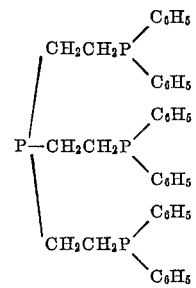

having the melting point of 131° C. The infrared spectrum of this product compound was identical to the compound prepared in Example 1, supra. The yield was approximately 89%. An excess of phosphine was used.

Additional product compounds using reaction conditions and reactant amounts and catalysts similar to the foregoing examples are prepared, and to save repetitive details, are presented in Table I, setting forth the reactant compounds and the product compounds, as follows:

TABLE I

Example 15

Reactant compound (1)—$(C_6H_5)_2PH$
Reactant compound (2)—$[(CH_3)_2N]_2PCH=CH_2$
Mole ratio of (1) to (2)—1:1
Product—$(C_6H_5)_2PCH_2CH_2P[N(CH_3)_2]_2$
Yield—approximately 84%
Catalyst—phenyllithium Example 16

Reactant compound (1)—$CH_3PH_2$
Reactant compound (2)—$(C_6H_5)_2PCH=CH_2$
Mole ratio of (1) to (2)—1:2

TABLE I—Example 16—Contd.
Product—$CH_3P[CH_2CH_2P(C_6H_5)_2]_2$
Yield—approximately 87%
Catalyst—potassium tert-butoxide

Example 17
Reactant compound (1)—$(C_6H_5)_2PH$
Reactant compound (2)—$(C_6H_5O)_2PCH=CHCH_3$
Mole ratio of (1) to (2)—1:1
Product—$(C_6H_5O)_2PCH_2CH(CH_3)P(C_6H_5)_2$
Yield—approximately 79%
Catalyst—phenyllithium

Example 18
Reactant compound (1)—$(C_6H_5)_2PH$
Reactant compound (2)—$(C_6H_5)_2PC\equiv C(OC_2H_5)$
Mole ratio of (1) to (2)—1:1
Product—$(C_6H_5)_2PC(OC_2H_5)=CHP(C_6H_5)_2$
Yield—approximately 81%
Catalyst—potassium tert-butoxide

Example 19
Reactant compound (1)—
  $C_6H_5P(H)CH_2CH_2P(C_6H_5)CH_2CH_2P(H)C_6H_5$
Reactant compound (2)—$(CH_3)_2PCH=CH_2$
Mole ratio of (1) to (2)—1:2
Product—$(CH_3)_2P[CH_2CH_2P(C_6H_5)]_3CH_2CH_2P(CH_3)_2$
Yield—approximately 64%
Catalyst—phenyllithium

Example 20
Reactant compound (1)—$H_2PCH_2CH(CH_3)PH_2$
Reactant compound (2)—$(CH_3)_2PCH=CH_2$
Mole ratio of (1) to (2)—1:4
Product—
  $[(CH_3)_2PCH_2CH_2]_2PCH_2CH(CH_3)P[CH_2CH_2P(CH_3)_2]_2$
Yield—approximately 68%
Catalyst—phenyllithium

Example 21
Reactant compound (1)—$(C_6H_5)(CH_3)PH$
Reactant compound (2)—$(C_6H_5)(CH_3)PCH=CH_2$
Mole ratio of (1) to (2)—1:1
Product—$(C_6H_5)(CH_3)PCH_2CH_2P(CH_3)(C_6H_5)$
Yield—approximately 85%
Catalyst—potassium tert-butoxide

Example 22
Reactant compound (1)—$(C_6H_5)_2PH$
Reactant compound (2)—$(p\text{-}CH_3C_6H_4)_2PCH=CH_2$
Mole ratio of (1) to (2)—1:1
Product—$(p\text{-}CH_3C_6H_4)_2PCH_2CH_2P(C_6H_5)_2$
Yield—approximately 89%
Catalyst—phenyllithium In carrying out the novel processes, including those in Examples 1–22, inclusive, of our invention, aryllithium catalysts, for example, phenyllithium, and alkyllithium catalysts are not used in reactions wherein diphenylarsine is one of the reactants. In determining the molecular weights of each of the compounds hereinbefore described in detail, a Mechrolab vapor pressure osmometer using benzene as the solvent for the compound whose molecular weight was under determination was used. In the novel processes herein described in detail there was carried out the base catalyzed addition of a phosphorus-hydrogen bond or an arsenic-hydrogen bond across a carbon-carbon double bond or a carbon-carbon triple bond, and the product compounds did not contain any phosphorus-hydrogen bond or arsenic-hydrogen bond. As is readily apparent from the foregoing detailed description, where one reactant has only one phosphorus-hydrogen bond or one arsenic-hydrogen bond and the other reactant has only one carbon-carbon double or triple bond, the ratio of the number of moles of the carbon-carbon double or triple bond containing reactant to the number of moles of phosphorus-hydrogen or arsenic-hydrogen bond containing reactant is 1:1. Where one reactant compound has two phosphorus-hydrogen or two arsenic-hydrogen bonds and the other reactant has only one carbon-carbon double or triple bond, the ratio of the number of moles of the carbon-carbon double or triple bond containing reactant to the number of moles of the phosphorus-or arsenic-hydrogen bond containing reactant is in the ratio of 2:1. Where one reactant compound has three phosphorus- or arsenic-hydrogen bonds, and the other reactant has only one carbon-carbon double or triple bond, the ratio of the number of moles of the carbon-carbon double or triple bond containing reactant to the number of moles of the phosphorus- or arsenic-hydrogen bond containing reactant is 3:1. Where one reactant compound has four phosphorus- or arsenic-hydrogen bonds and the other reactant has only one carbon-carbon double or triple bond, the ratio of the number of moles of the carbon-carbon double or triple bond containing reactant to the number of moles of the phosphorus- or arsenic-hydrogen bond containing reactant is 4:1. Likewise, where one reactant has only one carbon-carbon double or triple bond, the ratio of the number of moles of it to the number of moles of the reactant having only one phosphorus- or arsenic-hydrogen bond is 1:1. Where one reactant compound has two carbon-carbon double or triple bonds, the ratio of the number of moles of it to the number of moles of the reactant having only one phosphorus- or arsenic- hydrogen bond is 2:1. Where one reactant compound has three carbon-carbon double or triple bonds, the ratio of the number of moles of it to the number of moles of the reactant having only one phosphorus- or arsenic-hydrogen bond containing reactant is 3:1.

The novel polydentate polytertiary phosphines and arsines and arsino-phosphines of our invention are useful as ligands for making complexes with metal carbonyls and metal halides useful as catalysts for polymerization and oligomerization of olefins and acetylenes. The multidentate character of our novel compounds contribute to the effectiveness of the resulting so-formed catalysts with said carbonyls and halides. Complexes of our novel compounds with nickel carbonyl oligomerize or polymerize, for example, butadiene. Also, mixtures of our novel compounds with halides of titanium, zirconium, vanadium, niobium, and related metals, in the presence of aluminum alkyls are useful for producing polyethylene. Further, nickel complexes of our novel compounds in the presence of sodium borohydride are useful for the polymerization of acetylenes.

Many alterations and changes may be made without departing from the spirit and scope of this invention which is set forth in the appended claims which are to be construed as broadly as possible in view of the prior art.

We claim:

1. A polydentate selected from the group consisting of (1)     $X(AYR^1R^2)_3$ wherein
  X is a member in its trivalent state selected from the group consisting of phosphorus and arsenic,
  Y is a member in its trivalent state selected from the group consisting of phosphorus and arsenic,
  A is a member selected from the group consisting of $-CR°=CR°-$ and $-CR°_2-CR°_2-$ wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the proviso that at least one R° is hydrogen, and each of $R^1$ and $R^2$ is a member selected from the group consisting of alkyl, aromatic hydrocarbon, alkoxy substitution products of said alkyl and aromatic hydrocarbon, and dialkylamino substitution products of said alkyl and aromatic hydrocarbon;

(2) 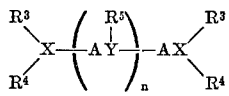

wherein $n$ is a whole number of at least 2,

X is a member in its trivalent state selected from the group consisting of phosphorus and arsenic, Y is a member in its trivalent state selected from the group consisting of phosphorus and arsenic, with the proviso that X is always the same, A is a member selected from the group consisting of

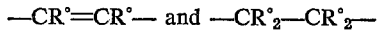

wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the provisio that at least one R° is hydrogen, each of $R^3$, $R^4$ and $R^5$ is a member selected from the group consisting of alkyl, aromatic hydrocarbon, alkoxy substitution products of said alkyl and aromatic hydrocarbon, and dialkylamino substitution products of said alkyl and aromatic hydrocarbon;

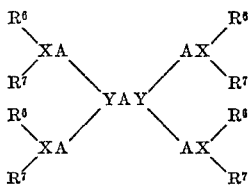

wherein

X is a member in its trivalent state selected from the group consisting of phosphorus and arsenic, Y is a member in its trivalent state selected from the group consisting of phosphorus and arsenic, with the proviso that all of the X and Y members are never all arsenic and X is always the same, A is a member selected from the group consisting of

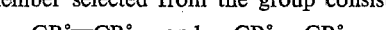

wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the proviso that at least one R° is hydrogen, and each of $R^6$ and $R^7$ is a member selected from the group consisting of alkyl, aromatic hydrocarbon, alkoxy substitution products of said alkyl and aromatic hydrocarbon, and dialkylamino substitution products of said alkyl and aromatic hydrocarbon; and (4) $R^8{}_mX(AYR^9R^{10})_{3-m}$ wherein $m$ is a whole number from 1-2, inclusive, X is a member in its trivalent state selected from the group consisting of phosphorus and arsenic, Y is a member in its trivalent state selected from the group consisting of phosphorus and arsenic, with the proviso that X and Y are different, A is a member selected from the group consisting of

wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the proviso that at least one R° is hydrogen, and each of $R^8$, $R^9$ and $R^{10}$ is a member selected from the group consisting of alkyl, aromatic hydrocarbon, alkoxy substitution products of said alkyl and aromatic hydrocarbon, and dialkylamino substitution products of said alkyl and aromatic hydrocarbon, the number of carbon atoms in the aforestated alkyl groups being from 1 through 70, the number of carbon atoms in the aforestated aromatic hydrocarbon groups being from 6 through 24, the number of carbon atoms in the aforestated alkoxy substituent groups of the aforestated alkoxy substituted alkyl groups and aromatic hydrocarbon groups being from 1 through 70, and the number of carbon atoms in the alkyl group of aforestated dialkylamino substituent groups of the aforestated dialkylamino substituted alkyl groups and aromatic hydrocarbon groups being from 1 through 70.

2. The polydentate compound of claim 1 having the formula $$X(AYR^1R^2)_3$$

wherein

X is a member in its trivalent state selected from the group consisting of phosphorus and arsenic, Y is a member in its trivalent state selected from the group consisting of phosphorus and arsenic, A is a member selected from the group consisting of , wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the proviso that at least one R° is hydrogen, and each of $R^1$ and $R^2$ is a member selected from the group consisting of alkyl, aromatic hydrocarbon, alkoxy substitution products of said alkyl and aromatic hydrocarbon, and dialkylamino substitution products of said alkyl and aromatic hydrocarbon.

3. The polydentate compound of claim 1 having the formula

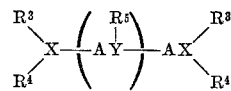

wherein $n$ is a whole number of at least 2,

X is a member in its trivalent state selected from the group consisting of phosphorus and arsenic, Y is a member in its trivalent state selected from the group consisting of phosphorus and arsenic, with the proviso that X is always the same, A is a member selected from the group consisting of —CR°=CR°— and —CR°$_2$—CR°$_2$—, wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the proviso that at least one R° is hydrogen, and each of $R^3$, $R^4$ and $R^5$ is a member selected from the group consisting of alkyl, aromatic hydrocarbon, alkoxy substitution products of said alkyl and aromatic hydrocarbon, and dialkylamino substitution products of said alkyl and aromatic hydrocarbon.

4. The polydentate compound of claim 1 having the formula

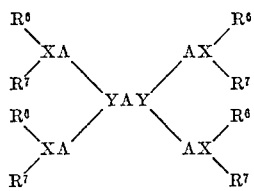

wherein

X is a member in its trivalent state selected from the group consisting of phosphorus and arsenic, Y is a member in its trivalent state selected from the group consisting of phosphorus and arsenic, with the proviso that all of the X and Y members are never all arsenic and X is always the same, A is a member selected from the group consisting of —CR°=CR°— and —CR$_2$°—CR$_2$°—, wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the proviso that at least one R° is hydrogen, and each of R$^6$ and R$^7$ is a member selected from the group consisting of alkyl, aromatic hydrocarbon, alkoxy substitution products of said alkyl and aromatic hydrocarbon, and dialkylamino substitution products of said alkyl and aromatic hydrocarbon.

5. The polydentate compound of claim 1 having the formula $$R_m{}^8 X(AYR^9R^{10})_{3-m}$$

wherein m is a whole number from 1–2, inclusive,

X is a member in its trivalent state selected from the group consisting of phosphorus and arsenic, Y is a member in its trivalent state selected from the group consisting of phosphorus and arsenic, with the proviso that X and Y are different, A is a member selected from the group consisting of —CR°=CR°— and —CR$_2$°—CR$_2$°—, wherein R° is a member selected from the group consisting of hydrogen, alkyl, aromatic hydrocarbon, alkoxy substitution products of said alkyl and aromatic hydrocarbon, and dialkylamino substitution products of said alkyl and aromatic hydrocarbon, with the proviso that at least one R° is hydrogen, and each of R$^8$, R$^9$ and R$^{10}$ is a member selected from the group consisting of alkyl, aromatic hydrocarbon, alkoxy substitution products of said alkyl and aromatic hydrocarbon, and dialkylamino substitution products of said alkyl and aromatic hydrocarbon.

6. The polydentate compound of claim 2 wherein X is phosphorus, Y is phosphorus, A is —CH$_2$CH$_2$—, R$^1$ is phenyl, and R$^2$ is phenyl, said compound being tris (2-diphenylphosphinoethyl) phosphine having the formula

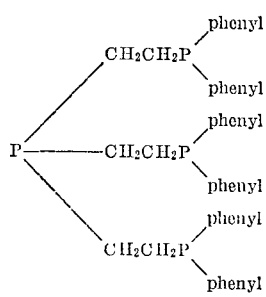

7. The polydentate compound of claim 3 wherein n is 2, X is phosphorus, Y is phosphorus, A is —CH$_2$CH$_2$—, R$^3$ is phenyl, R$^4$ is phenyl, and R$^5$ is phenyl, said compound being 1,1,4,7,10,10-hexaphenyl-1,4,7,10-tetraphosphadecane having the formula

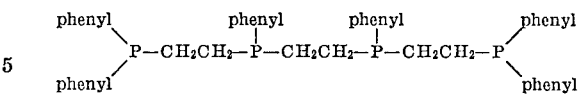

8. The polydentate compound of claim 3 wherein n is, 3, X is phosphorus, Y is phosphorus, A is —CH$_2$CH$_2$—, R$^3$ is methyl, R$^4$ is methyl, and R$^5$ is phenyl, said compound being 1,1,13,13 - tetramethyl - 4,7,10 - triphenyl-1,4,7,10,13-pentaphosphatridecane having the formula

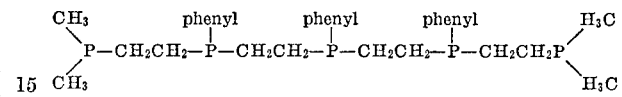

9. The polydentate compound of claim 4 wherein X is phosphorus, Y is phosphorus, A is —CH$_2$CH$_2$—, R$^6$ is phenyl, and R$^7$ is phenyl, said compound being 1,1,4,4-tetrakis (2-diphenylphosphinoethyl)-1,4-diphosphabutane having the formula

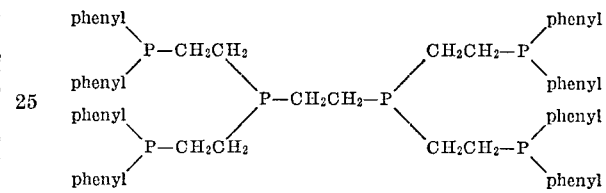

10. The polydentate compound of claim 5 wherein m is 2, X is phosphorus, Y is phosphorus, A is —CH$_2$CH$_2$—, R$^8$ is phenyl, R$^9$ is phenyl, and R$^{10}$ is phenyl, said compound being 1-diphenylphosphino-2-diphenylarsinoethane having the formula

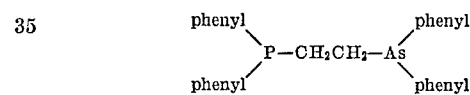

11. The polydentate compound of claim 5 wherein m is 2, X is arsenic, Y is phosphorus, A is —CH=CH—, R$^8$ is phenyl, R$^9$ is phenyl, and R$^{10}$ is phenyl, said compound being trans-1-diphenylphosphino-2-diphenylarsinoethylene having the formula

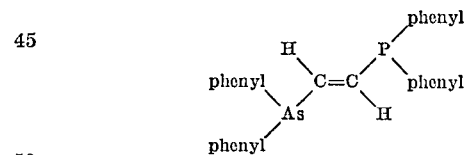

12. The polydentate compound of claim 5 wherein m is 1, X is phosphorus, Y is arsenic, A is —CH$_2$CH$_2$—, R$^9$ is phenyl, and R$^{10}$ is phenyl, said compound being bis(2-diphenylarsinoethyl) phenylphosphine having the formula

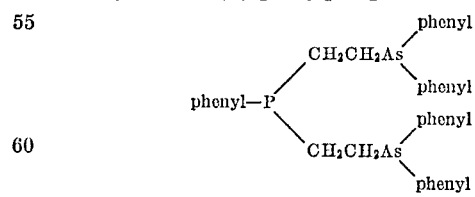

13. The process for preparing a polydentate compound comprising reacting, in contact with a base catalyst, (1) a reactant compound selected from the group consisting of (a) a phosphine having at least one phosphorus-hydrogen bond and (b) an arsine having at least one arsenic-hydrogen bond with (2) a reactant compound selected from the group consisting of (a) a phosphine having at least one vinyl-phosphorus bond, (b) an arsine having at least one vinyl-arsenic bond,
(c) a phosphine having at least one ethynyl-phosphorus bond, and
(d) an arsine having at least one ethynyl-arsenic bond, with the proviso that each of the phosphorus and the arsenic is in its trivalent state, and with the further provisos (1) that reactant compound (1) is free of a vinyl-phosphorus bond, a vinyl-arsenic bond, an ethynyl-phosphorus bond and an ethynyl-arsenic bond and reactant compound (2) is free of a phosphorus-hydrogen bond and an arsenic-hydrogen bond, (2) that reactant compound (1) has only one phosphorus-hydrogen bond or arsenic-hydrogen bond if reactant compound (2) has a plurality of vinyl-phosphorus bonds, vinyl-arsenic bonds, ethynyl-phosphorus bonds or ethynyl-arsenic bonds, (3) that reactant compound (1) has only one vinyl-phosphorus bond, vinyl-arsenic bond, ethynyl-phosphorus bond or ethynyl-arsenic bond if reactant compound (2) has a plurality of phosphorus-hydrogen bonds or arsenic-hydrogen bonds, and (4) that an alkyllithium and an aryllithium are not used as base catalysts if reactant compound (1) is diphenylarsine.

14. The process of claim 13 wherein the base catalyst is a member selected from the group consisting of
(1) an alkyllithium,
(2) an aryllithium,
(3) an alkoxide of a member selected from the group consisting of alkali metals, alkaline earth metals and lanthanide elements,
(4) a dialkylamido derivative of a member selected from the group consisting of alkali metals, alkaline earth metals and lanthanide elements,
(5) an arylalkylamido derivative of a member selected from the group consisting of alkali metals, alkaline earth metals and lanthanide elements,
(6) a diarylamido derivative of a member selected from the group consisting of alkali metals, alkaline earth metals and lanthanide elements,
(7) strongly basic amines, and
(8) mixtures thereof.

15. The process of claim 14 wherein the base catalyst is phenyllithium.

16. The process of claim 14 wherein the base catalyst is potassium tert.-butoxide.

References Cited
UNITED STATES PATENTS

| | | | |
|---|---|---|---|
| 3,086,053 | 4/1963 | Wagner | 260—606.5 P |
| 3,086,054 | 4/1963 | Chatt et al. | 260—606.5 P |
| 3,253,033 | 5/1966 | Maier | 260—606.5 P |
| 3,518,312 | 6/1970 | Maier | 260—606.5 P |

JAMES E. POER, Primary Examiner
W. F. W. BELLAMY, Assistant Examiner

U.S. Cl. X.R.

260—606.5 P